US 8,825,959 B1

(12) United States Patent
Switakowski et al.

(10) Patent No.: US 8,825,959 B1
(45) Date of Patent: Sep. 2, 2014

(54) METHOD AND APPARATUS FOR USING DATA ACCESS TIME PREDICTION FOR IMPROVING DATA BUFFERING POLICIES

(75) Inventors: Michal Switakowski, Warsaw (PL); Peter Boncz, Amsterdam (NL); Marcin Zukowski, Amsterdam (NL)

(73) Assignee: Actian Netherlands B.V., Amsterdam (NL)

( * ) Notice: Subject to any disclaimer, the term of this patent is extended or adjusted under 35 U.S.C. 154(b) by 145 days.

(21) Appl. No.: 13/562,884

(22) Filed: Jul. 31, 2012

(51) Int. Cl.
*G06F 12/12* (2006.01)

(52) U.S. Cl.
CPC .................................. *G06F 12/12* (2013.01)
USPC ........................................ 711/133

(58) Field of Classification Search
CPC . G06F 12/08; G06F 12/0815; G06F 12/0842; G06F 12/0888; G06F 12/0891; G06F 12/12; G06F 12/122; G06F 12/128
See application file for complete search history.

(56) References Cited

U.S. PATENT DOCUMENTS

| 7,089,362 | B2 * | 8/2006 | Creta et al. .................. 711/133 |
| 8,095,738 | B2 * | 1/2012 | Benhase et al. ............... 711/134 |
| 8,606,994 | B2 * | 12/2013 | Ledford ........................ 711/114 |
| 2008/0120469 | A1 * | 5/2008 | Kornegay et al. ............. 711/133 |
| 2009/0300631 | A1 * | 12/2009 | Karlapalem et al. .......... 718/103 |

OTHER PUBLICATIONS

C. A. Lang, B. Bhattacharjee, T. Malkemus, S. Padmanabhan, and K. Wong. Increasing buffer-locality for multiple relational table scans through grouping and throttling. In ICDE, Istanbul, Turkey, 2007 (10 pgs.).
Marcin Zukowski, Sandor Heman, Niels Nes, Peter Boncz. *Cooperative Scans: Dynamic Bandwidth.Sharing in a DBMS*. VLDB 2007, Vienna, Austria, Sep. 2007 (12 pgs.).

* cited by examiner

*Primary Examiner* — Hiep Nguyen
(74) *Attorney, Agent, or Firm* — DLA Piper LLP (US)

(57) ABSTRACT

A system and method for buffer management in a database are provided in which a predictive buffer manager may be used. The predictive buffer manager and process may predict when each block in a buffer is going to be used and then manages the buffer based on the prediction.

23 Claims, 8 Drawing Sheets

METHOD AND APPARATUS FOR USING DATA ACCESS TIME PREDICTION FOR IMPROVING DATA BUFFERING POLICIES

FIELD

The disclosure generally relates to a buffer management system and in particular to a method and system for improving buffer management by means of predictive buffer management. The disclosure may be implemented in a database management system, but may be implemented with other systems that access data that would benefit from predictive buffer management.

BACKGROUND

Figure 4:
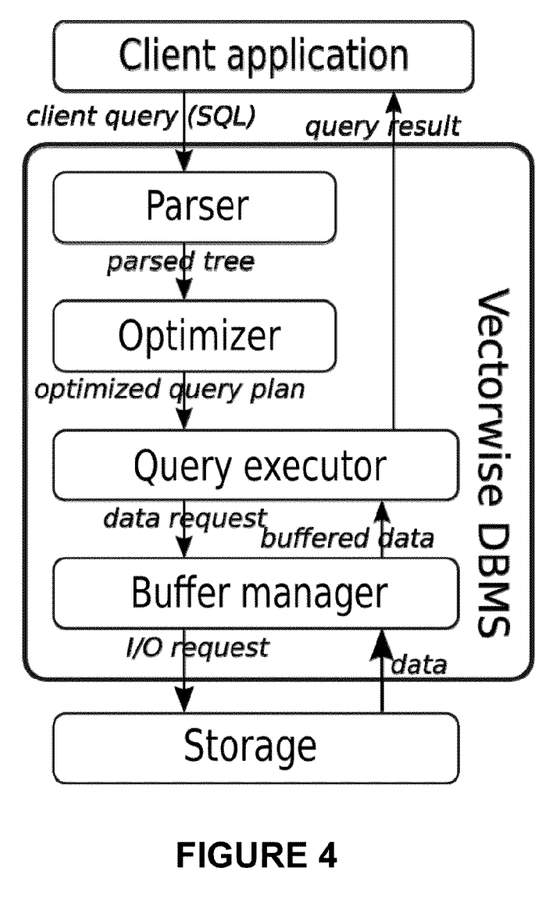
FIG. 4 is a block diagram illustrating layers comprising a database management system.

A Database Management System (DBMS) is a software package that provides a reliable way to store data in a database and process it. One of the main requirements of a DBMS is to provide a coherent interface that allows application developers to manipulate data stored in a database. The architecture of most DBMSs follows a multilayer approach, where each layer is responsible for other phase of processing. Typical DBMS layers are depicted in FIG. 4 and comprise: 1) a client application, which issues a query to the DBMS; 2) a query parser, which parses the text representation of a query and creates an internal representation used by the DBMS; 3) a query optimizer, which tries to find an efficient way to execute the query and creates a query plan; 4) a query executor, which does the actual processing of the data; 5) a buffer manager, that loads data from the storage and buffers it in the memory for processing; and 6) storage, which handles storing data on persistent storage device such as hard disk.

For datasets that do not fit in memory, the DBMS typically buffers parts of data in memory using the buffer manager component. The buffer manager is responsible for handling requests received from the query executor and making decisions about what data should be cached in the memory. The data on disk is typically split into blocks (or "pages"), and both loading and buffering solutions are based on this granularity. Each database query needs to read a collection of blocks. Since the buffer is capable of caching only a part of the data, there is a need for a policy governing what data should be cached. In particular, when a new block is loaded into memory and the buffer is full, there needs to be a policy deciding which of the already-cached blocks should be evicted.

Hence it is desirable, for the DBMS, to increase the efficiency of the buffer manager layer which results in an overall performance improvement.

Most databases use quite sophisticated buffering mechanisms, but typically these are targeted at transaction processing (OLTP) scenarios. These buffering mechanisms are not good for large scans typically found in analytical (OLAP) scenarios and would cause a lot of unnecessary input/output (IO), translating to bad performance. A scan typically accesses a range or multiple ranges, each comprising a large number of blocks (e.g. 10-1000). Blocks are typically requested in sequential fashion, i.e. the order of requests corresponds to the logical order of blocks on the disk.

Some conventional systems use a "least recently used" (LRU) buffering strategy. This policy discards blocks that have not been used for the longest time. This policy however, does not perform well in case of large scans. To illustrate, in a system that contains a table consisting of 100 sequential blocks numbered 1-100, a buffer manager can hold 90% of the table. After a full scan of a table, the last 90% of the table (hence blocks 11-100) will be cached in memory. When another scan starts, it will ask for block 1. The LRU policy will look at which block to evict, and it will see that the least-recently-used block is block 11 and it will be evicted. When scanning block 2, block 12 will be evicted, and so on. When the scan gets to block 11, it will not be in memory, and block 22 will be evicted. The net effect will be that all blocks will be evicted only to be quickly re-loaded which is inefficient. It is desirable to be able to overcome this inefficiency of the LRU buffering.

An alternative policy used by some conventional systems is the "most recently used" (MRU) which is better in the case of a large scan than LRU. However, MRU is not feasible as a general purpose strategy in a real system, as it suffers in other cases, e.g. when queries access different tables and different subsets of columns. In many situations, MRU turns out to be worst possible solution leading to performing an I/O operation on every block request. For example, suppose a query reading table A is executed and table A is large enough to fill the whole buffer pool. Afterwards, a query reading table B is run. The MRU method first evicts the most recently used block from table A to replace it with a block belonging to table B. Since the block from table B is now the most recently used, it is evicted to load the next block from table B. The process continues until a query is finished leaving the buffer pool with one block belonging to table B and all other blocks belonging to table A. If subsequent queries happen to access table B as well, they effectively can not reuse cached blocks, because the buffer is occupied mostly with blocks from table A. It is desirable to achieve better performance than with the MRU approach.

Other systems attempt to modify the access pattern of a scan so that the buffer manager copes better with the scans. The idea is to make concurrent scan operations access the same data at the same time or at least data that has been recently accessed (and is still buffered). Circular scans used by Microsoft® SQL Server is an example of such a solution. However, circular scans require the query executor to accept data out-of-order which is some cases is impossible or has significant structural impact on DBMS. Another approach is to have an ability to throttle scans (IBM® DB2 as described in C. A. Lang, B. Bhattacharjee, T. Malkemus, S. Padmanabhan, and K. Wong, "Increasing Buffer-Locality For Multiple Relational Table Scans Through Grouping And Throttling", IEEE International Conference on Data Engineering (ICDE), Istanbul, Turkey (2007.)). While maintaining the order of data delivery, throttling of scans provides benefits in only limited number of scenarios.

Another solution are "Cooperative Scans" (See Marcin Zukowski, Sandor Heman, Niels Nes, Peter Boncz, "Cooperative Scans: Dynamic Bandwidth Sharing in a DBMS", International Conference on Very Large Databases 2007, Vienna, Austria (September 2007.)) It provides multiple benefits for scan oriented applications, typically allowing it to achieve performance much better than all other solutions. However, this approach requires very complex modifications to buffer manager component and it is also limited to scenarios where query executor can accept data delivered in an out-of-order fashion.

It is desirable to provide a method and system that improves buffer management efficiency, such as for easy integration with a modern DBMS and it is to this end that the disclosure is directed.

DESCRIPTION OF ONE OR MORE EMBODIMENTS

The disclosure is particularly applicable to a Predictive Buffer Management system implemented in a Vectorwise database system commercially available from Actian Corporation and it is in this context that the disclosure will be described. It will be appreciated, however, that the Predictive Buffer Management system and method has greater utility since the system and method can be used with any data access system in which the data access is predictable and that can benefit from the predictive buffer management system. The system and method has a potential of improving buffer management efficiency in different database systems or data access systems, translating to overall system performance. Furthermore, the system and method could also be used on the operating system level, if OS APIs are provided such that applications can express up-front the data they are to consume. Before describing the details of the Predictive Buffer Management, an overview of an example of a database system on which the Predictive Buffer Management may be implemented is described.

Figure 1:
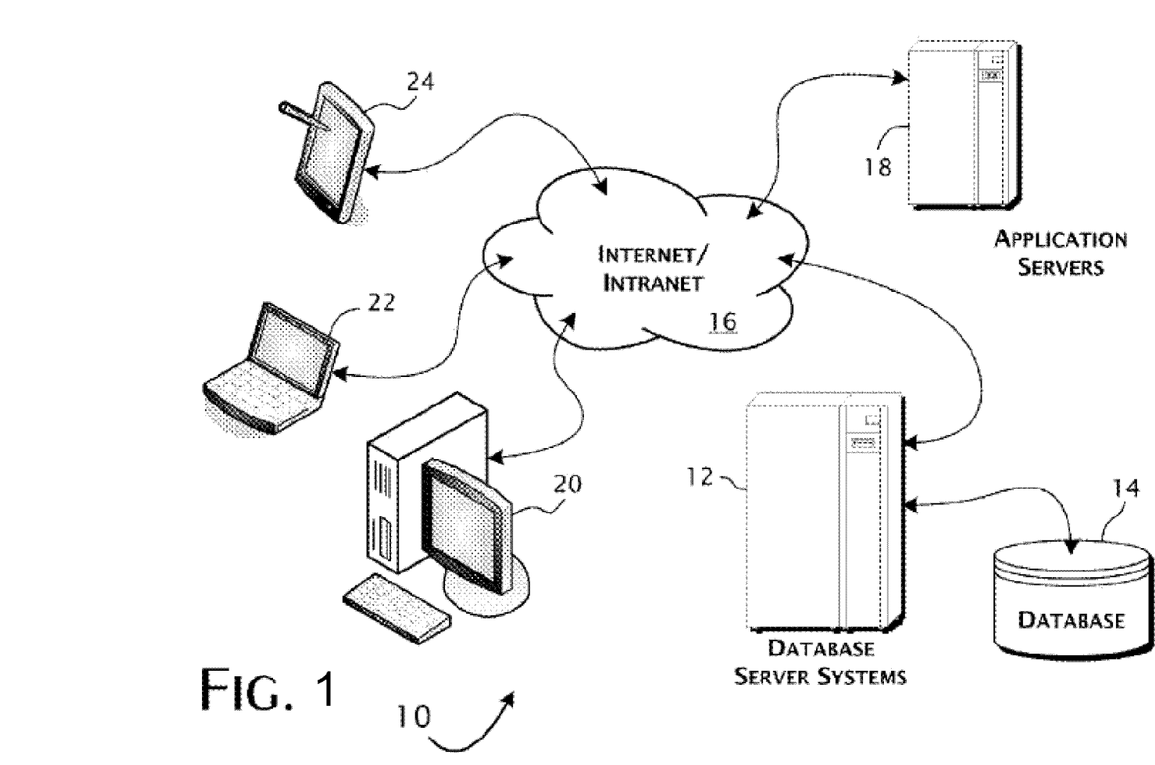
FIG. 1 is a system diagram illustrating an implementation of an operating environment of a database system.

FIG. 1 is a system diagram illustrating an implementation of an operating environment 10 of a database system. In the environment, one or more database server systems 12 host, directly or indirectly, a storage device 14, such as for example a database. Access requests are typically received over a wired or wireless link 16, such as for example, the Internet and intranet or other networks, from various sources such as for example one or more application servers 18 that are each executing on-line transaction processing (OLTP) and/or online analytical processing (OLAP) applications. The specific operations of the applications are typically directed by or executed in support of requests from one or more computing units, such as for example, client applications executed on client computers 20 of various types including mobile computers 22 and communications devices 24. Each computing unit may be a processing unit based device with sufficient processing power, memory and connectivity to interact with the database server system 12. For example, each computing device may be a smartphone (Apple iPhone, RIM Blackberry, Android based devices etc.), a personal computer, a tablet computer and the like.

Figure 2:
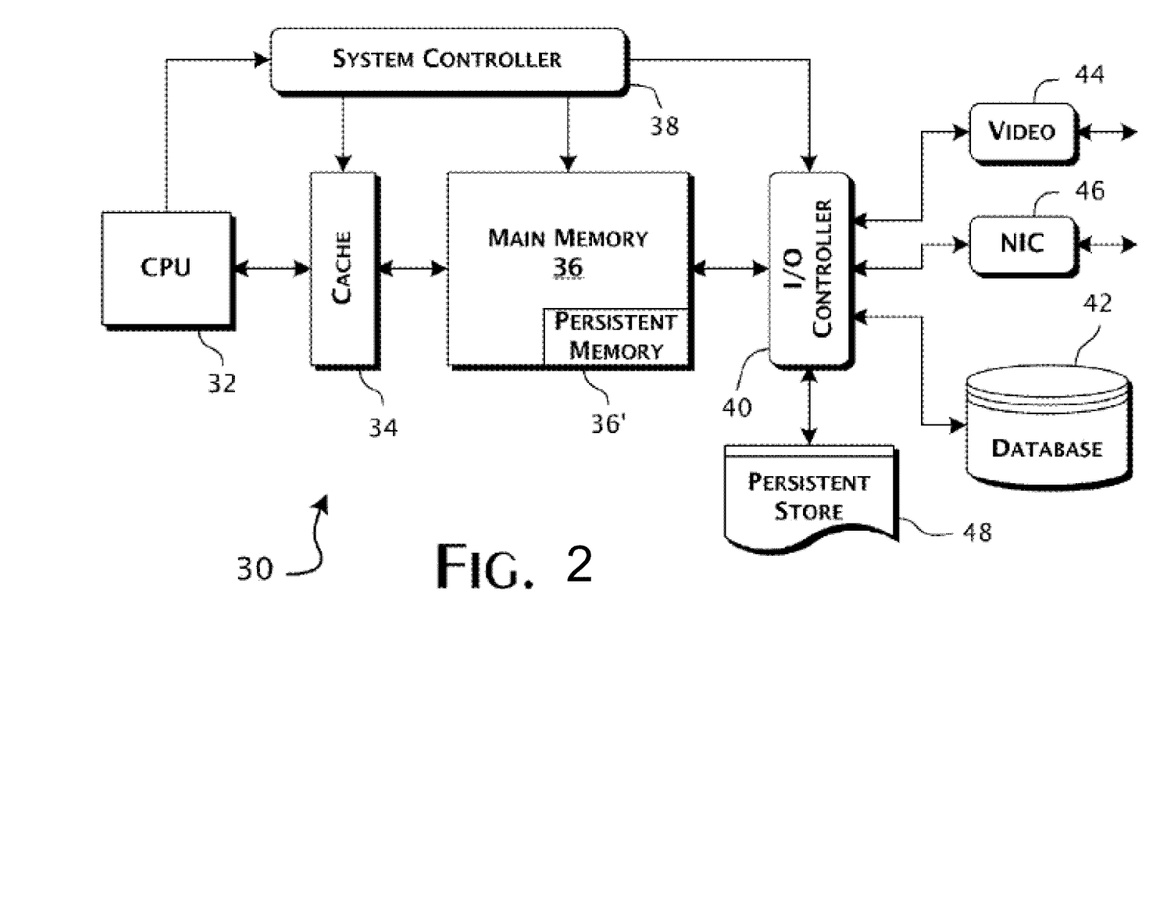
FIG. 2 is a simplified block diagram of an implementation of a computer database system.

FIG. 2 is a simplified block diagram of an implementation of a computer database system 30 for the database system 12 that may implement the predictive buffer management method. The database system 30 may include one or more central processing unit (CPU) subsystem 32, implemented for example as a multi-core, multiprocessor subsystem, includes some combination of in-core and close coupled cache subsystem 34 connected to a main memory store 36. In typical embodiments, the cache subsystem 34 will range from 2 to 32 megabytes per core with typically additional, larger cache layers shared among the cores within the CPU subsystem 32 and the main memory 36 will be substantially larger. A portion 36' of the main memory store 36 may be implemented to be persistent memory so that the data is maintained even when power is removed, such as by using Flash memory or a conventional backup battery solution. A system controller 38 manages data transfers between the central processing subsystem 32, cache 34, and main memory 36 subsystems through one or more input/output (I/O) controllers 40 that connect, directly or indirectly, to a physical database 42, and I/O devices, including typically a video controller 44 and network interface controller 46. A high-access rate persistent store 48, utilizing a high-performance magnetic or Flash emulation disk, may also be provided.

Figure 3:
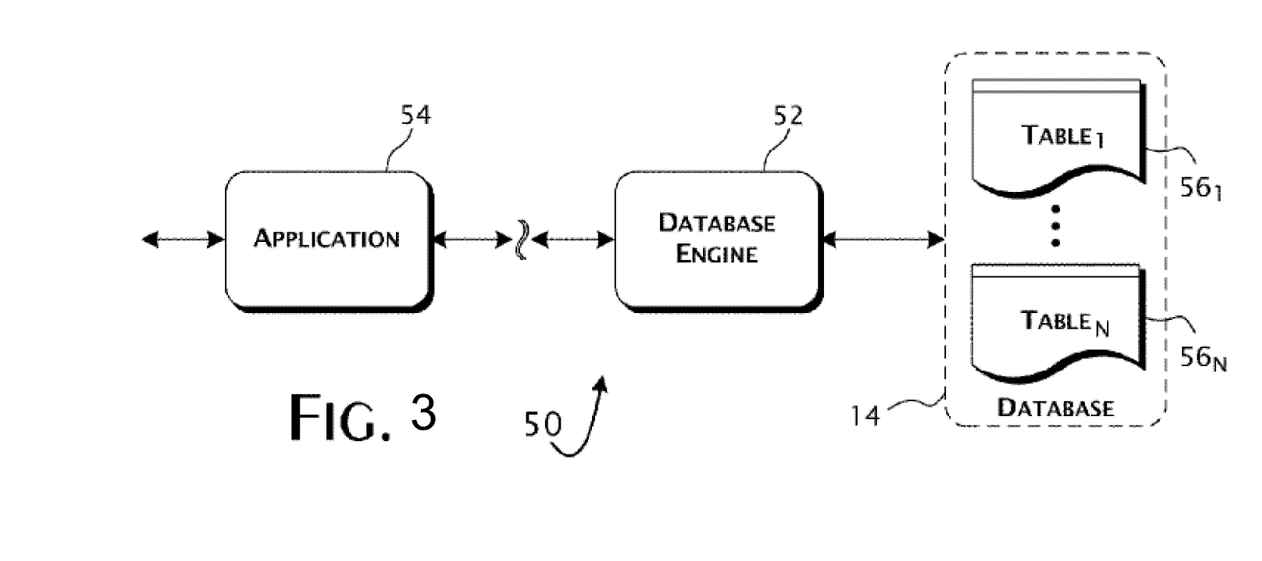
FIG. 3 is a block diagram illustrating a preferred tiered implementation of the database system.

FIG. 3 is a block diagram illustrating a preferred tiered implementation of the database system execution environment 50 that is implemented in or as part of a database engine 52. Database read and update requests are received from one or more applications 54 and satisfied by access to a database 14 containing one or more data tables, such as $56_1, \ldots, 56_N$ as shown in FIG. 3. The one or more applications 54 may be executed local or remote with respect to the database engine 52. The database 14 may be implemented using a physical storage device 42 connected directly to a database server system 12 that executes the database engine 52 or remotely through storage area network (SAN) or other distributed data storage system.

The above database system, including the database engine 52, may implement a Predictive Buffer Management method. The Predictive Buffer Management method may be implemented in hardware and interact with a database server or DBMS, but may also be implemented in software and be part of the database engine 52 or database management system (DBMS) that executes on the database servers of the database system.

The Predictive Buffer Manager (PBM) improves the logic of buffering disk-resident data in the in-memory database buffers of the database system. This is a critical functionality of DBMS, allowing reduction of performed IOs. Any improvement in this layer directly translates to performance improvements and possible bottleneck elimination.

Figure 5:
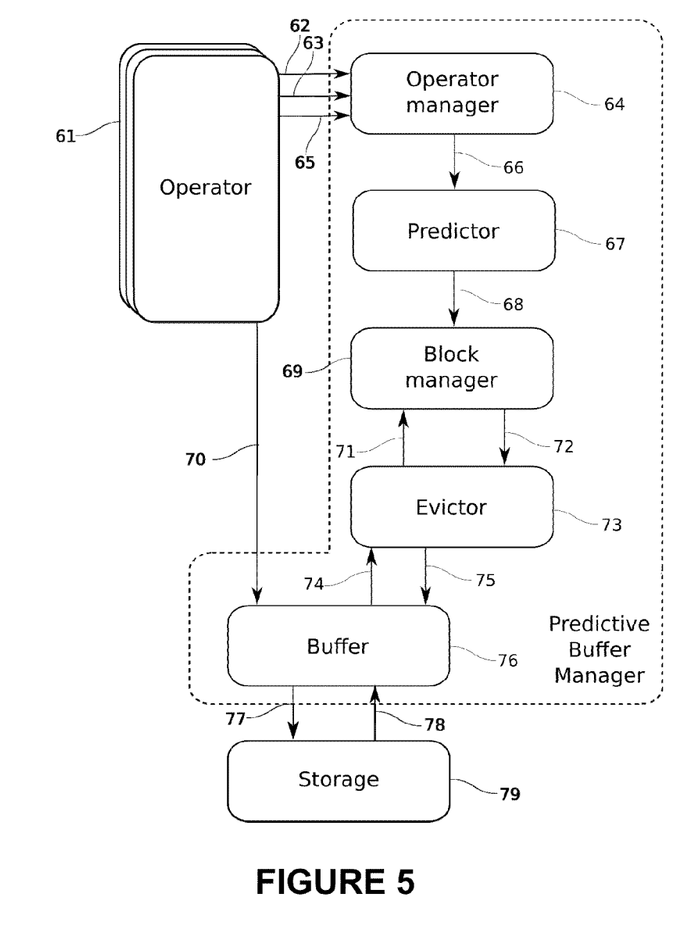
FIG. 5 shows the main components of the Predictive Buffer Management (PBM) method.

FIG. 5 depicts the main components of the PBM system and method. It comprises one or more concurrently operating Operator 61 objects requesting blocks, a Buffer 76 holding cached blocks loaded from Storage 79. The functional components of Predictive Buffer Manager include an Operator manager 64, Predictor 67, Block Manager 69 and Evictor 73.

The method and system works as follows. An Operator registers its data needs (62) to the Operator Manager 64 before it starts requesting blocks from the Buffer 76. An Operator can be a Scan operator or any other operator working in the DBMS that accesses blocks stored on disk or in the buffer, e.g. an Operator reading data temporarily stored on disk. The Operator Manager 64 saves information about data needed by the Operator and informs (66) the Predictor 67 that the workload changed. The Predictor component is responsible for predicting when a certain block will be requested. If the Predictor decides that its previous prediction should be changed, or a new block has been registered, it updates the Block Manager 69 with its latest predictions 68. The Block Manager 69 keeps information about all blocks that have been registered by Operators along with their time of the next expected request as supplied by the Predictor.

When an Operator requests a block (70), the Buffer 76 first checks if the block is already cached. If so, the block can be used immediately. Otherwise, the block needs to be loaded (77) from the Storage 79. When the block is returned from the storage (78), the buffer can cache it. However, if the buffer is already full, another block needs to be discarded (evicted) to make space in the buffer. To do that, Buffer asks (74) the Evictor component 73 which block should be evicted. The Evictor performs the process of finding a block that should be evicted. It communicates with the Block Manager (71, 72) to find the block with lowest priority. Once such a block is found, the Buffer is informed (75) about it, so that it can evict it. Depending on the implementation, eviction can take place before or after the block is requested from Storage.

During its lifetime the Operator informs the Operator Manager about it progress (63), as well as unregisters itself after finishing its work (65).

The Predictive Buffer Manager method and systems consists of several subprocedures and subsystems that are described below.

Operator Manager

The Operator Manager 64 is responsible for tracking all Operator objects in the system. It holds a collection of registered Operators along with necessary information about them. In one embodiment, for each Operator, it keeps the following attributes:

{Speed, Position, Blocks}

The "speed" attribute indicates an estimate of the processing speed. The speed can be expressed for example in tuples per second or blocks per second. The speed estimate can be obtained by taking into account the whole lifetime of an Operator or a chosen period of time.

Each registered Operator repeatedly reports its position, stored in the "position" attribute, allowing the Predictor to calculate the speed estimate.

The "blocks" attribute is a collection of blocks that were registered by an Operator. All these blocks will be requested by an Operator.

A sequence of blocks Operators operate on, typically constitute a logical object. In a database systems using row-wise storage (NSM), this can be a table. In a database systems using column-wise storage (DSM), this can be a single column of a table. Vectorwise uses a hybrid model using so called "PaxGroups", where one PaxGroup can contain an arbitrary subset of table columns (from one to all). Each block in a sequence of blocks constituting a PaxGroup stores the same set of columns for a collection of records belonging to the table. It should be noted that PBM functionality is applicable in all these scenarios.

Predictor

The Predictor component 67 uses information gathered by the Operator Manager to make predictions about the next expected request of a certain block. In one embodiment, the information needed to do that includes:

estimate of processing speed of all Operators that will request that block for each Operator the number of tuples or blocks that this Operator will process before requesting that block (the distance between the current position and the block)

In particular, if the speed is expressed in tuples per second and the distance in tuples, the time of the next consumption by a certain operator equals:

$$\text{next\_consumption} = \text{current\_time} + \text{distance}/\text{speed} \quad \text{(Eq. 1)}$$

The Predictor component 67 typically informs the Block Manager when predictions for newly-registered blocks are made, or when predictions for already registered blocks have changed. However, the decision whether new predictions are needed to be calculated and whether to pass new predictions to Block Manager depends on the implementation of Predictor.

Block Manager

Depending on the predicted time of the next request, the Block Manager component 69 keeps references to blocks in an organized way. Each block that is managed by the Block Manager has a priority based on the information supplied by the Predictor. The following operations are supported by the Block Manager:

add a block that has been loaded remove a block that has been evicted change the priority of a certain block get a block or a group of blocks with lowest priority Adding a new block is done whenever a new block is added to the Buffer. A block is removed from the Block Manager when the system decides to evict it. Modifications of priorities are triggered by the Predictor component that oversees the current workload managed by the Operator Manager. Finally, retrieving blocks with lowest priority is an operation needed in the process of evicting blocks that is managed by the Evictor component.

Evictor

The Evictor component 73 serves as a layer between the Buffer and the Block Manager that is responsible for deciding which blocks should be evicted when the buffer gets full. In one embodiment, the Evictor can work as presented in FIG. 6. The Evictor first chooses blocks for which it is known that there are no operators that will request them in the future (92). If such blocks are not available, the Evictor chooses the block which is predicted to be used at the latest moment in the future (94) and the replacement strategy is completed.

Description of an Implementation of a Predictive Buffer Management System Implemented in a Vectorwise Database System.

Operator Manager

The Operator Manager implemented in Vectorwise allows all Operators requesting block to register their data needs. In more detail, the functionality of accessing data stored in blocks is abstracted out in the Iterator object. Each Operator that needs to access data uses one or more Iterator objects. Thus, the Operator Manager manages Iterator objects. The following API is used to let iterators communicate with the Operator Manager:

IteratorID pbm_register_iterator(Iterator *);

void pbm_unregister_iterator(IteratorID id);

void pbm_register_blocks(IteratorID id, int num_blocks, Block **blocks, int num_ranges, int *lo, int *hi);

void pbm_unregister blocks(IteratorID id, Block **blocks, int num_blocks);

void pbm_report iterator_position(IteratorID id, int position, int num_consumed_tuples);

The pbm_register_iterator( ) function registers the Iterator object in the Operator Manager and assigns a unique ID to it. Metadata needed to track that Iterator is allocated. The unregister_iterator( ) function reverts the registration when the Iterator finishes working. The pbm_register_blocks( ) function supplies the Operator Manager with all information about future requests of a specified Iterator and passes an array of blocks in the order of future requests. Moreover, a list of all tuple ranges is passed that is needed to be able to calculate the number of tuples a certain Iterator has to process before reaching a certain block. This functionality will be discussed later in the description of the Operator Manager.

The pbm_unregister_blocks( ) function is used to unregister blocks that were not consumed by an Iterator e.g. when an Operator was aborted halfway. If the Operator finished normally, pbm_unregister_blocks( ) is called with an empty collection of blocks to inform the Operator Manager that all blocks were processed as it was expected.

During processing of blocks, an Iterator that registered itself in the Operator Manager reports its progress. Each registered Iterator executes the pbm_report_iterator_position( ) function every UPDATE_INTERVAL tuples are consumed. Each registered Iterator passes its position and number of consumed tuples, so that the Operator Manager can update its speed estimate. The value of UPDATE_INTERVAL is a configuration option and equals 1000000 (tuples) by default.

The Operator Manager also keeps metadata about PaxGroups (see above) that are currently processed by registered Iterators. For each such PaxGroup a collection of Iterators that process it is maintained.

Metadata representing a given PaxGroup is created when the first Iterator accessing it registers itself, and destroyed when the last Iterator using it unregisters itself.

The data structures used in the Operator Manager may include:

```
IteratorState {
iterator_id;
speed;
position;
num_consumed_tuples;
registered_blocks[ ];
tuples_to_consume[ ];
}
PaxGroupState {
paxgroup_id;
iterators[ ];
}
```

The Iterator State structure represents a working Iterator that is registered in the Operator Manager. It consists of the following attributes.
  iterator_id—a unique identifier assigned by the Operator Manager
  speed—the current estimate of the processing speed. It is calculated on every call to pbm_report_position( ) as the quotient of the number of consumed tuples and total processing time
  position—the current position of the Iterator. It is the number of tuples the Iterator last reported to be processing
  num_consumed_tuples—the number of tuples the Iterator most recently reported to have processed (consumed)
  registered_blocks[ ]—a collection of blocks that the Iterator most recently registered with the pbm_register_blocks( ) function The tuples_to_consume[ ] collection is a static index that allows to determine how many tuples an Iterator has to consume before reaching a certain region of a PaxGroup. It will be discussed in detail, as it is one of important data structures used by the Predictor component.

To build the tuples_to_consume[ ] index each PaxGroup is divided into equally-sized chunks (except for the last chunk which can be smaller). The size of a chunk is derived from the CHUNK_SIZE configuration option (1000000 by default).

The tuples_to_consume[i] determines how many tuples are placed before (i*CHUNK_SIZE)-th tuple an Iterator needs to process. If there are no tuples that Iterator processes between ((i−1)*CHUNK_SIZE)-th tuple and (i*CHUNK_SIZE)-th tuple, the value equals −1 i.e. the chunk is marked as not-needed.

For example, suppose that an Iterator wants to process tuples in the range [1500000, 2500000) and the whole PaxGroup contains 4500000 tuples. Thus, there are 5 chunks, for which the values of tuples_to_consume[ ] equal −1, −1, 500000, 1000000, −1 respectively.

The PaxGroupState structure represents a PaxGroup processed by at least one of active Iterators. It has a unique identifier allowing to distinguish it from other PaxGroup, so that no PaxGroup is registered twice. The iterators[ ] collection is used to keep references to all Iterators that currently operate on this PaxGroup. In the implementation used by Vectorwise an array of pointers to Iterator State structures is used.

Block Manager

The Block Manager component distinguishes different types of blocks. First of all, blocks are either cached or not cached in the memory. Blocks that are not cached in the memory are obviously not taken into account in the process of evicting blocks. Thus, there is no need for the Block Manager to keep them in a special way. Blocks that are cached are managed by the Block Manager allowing performing operations required by the Predictive Buffer Management method.

A cached block that is managed by the Block Manager has the following attributes:
  is_prefetched—a Boolean value indicating if the block is being prefetched, i.e. it is currently loading or scheduled for loading
  request_count—number of Iterators that registered need for this block
  first_tuple—the number of the first tuple this block contains. Each block belongs to a PaxGroup, and blocks within a PaxGroup are numbered from 0 to n according to their logical order. Logical order of tuples corresponds to logical order of blocks i.e. a range of consecutive blocks always contains a range of consecutive tuples.)
  paxgroup_state—reference to the PaxGroupState structure representing a PaxGroup this block belongs to Depending on the values of the above-mentioned attributes, the Block Manager keeps a block in a specific bucket. Buckets are simple collections of blocks, allowing to perform add and remove operations. Therefore, they can be implemented in various ways including e.g. single-linked list, double-linked list, array, hash table or a tree structure. In the embodiment of Predictive Buffer Management method used by Vectorwise double-linked lists are used.

The following collection of buckets is used in the Block Manager implemented in Vectorwise:
  prefetched
  not_requested
  reserved
  requested[1] . . . requested[N]

Blocks are being put on those buckets according to the following rules.

First of all, a block that is being processed (either read or modified) by an Operator is removed from bucket it belongs to for the time of processing. Thus, buckets contain only block that are not being processed. It should be stressed that a block can be processed concurrently by multiple Operators and it is added to its bucket back only when all Operators stop processing.

The "prefetched" bucket holds blocks for which the "prefetched" attribute equals TRUE. These are the blocks that are being prefetched i.e. asynchronous I/O is in progress for them.

The "not_requested" bucket holds blocks for which "request_count" equals 0 i.e. blocks that will not be requested by any of currently working Operators.

The "reserved" bucket holds blocks for which "request_count" is greater than 0 and all Operators that will request those blocks do not have an estimate of the processing speed.

Finally, there is a number of "requested" buckets (from 1 to N) which hold blocks with "request_count" greater than 0 and that have been registered by at least one Operator that has an estimate of its processing speed. The exact bucket a block fulfilling this condition is put to depends on the estimate of its next consumption time which is supplied by the Predictor component.

The "requested" buckets are organized in a timeline, where each bucket i represents a time range [$start_i$, $end_i$).

Time ranges represented by neighboring buckets are neighbors as well i.e. end, always equals $start_{i+1}$. The boundaries of time ranges are determined as follows.

"Requested" buckets are divided into equally-sized bucket groups. There are m bucket groups, each containing k buckets. Thus there are m*k=N buckets in total. Buckets belonging to the same group represent time ranges of the same length. The sum of all time ranges represented by buckets of the same group is a continuous time range i.e. there are no holes. The length of time range represented by buckets of each subsequent group is two times larger than the length of time range of the previous group. Effectively, this length grows exponentially for each further group.

The length of time range represented by buckets of the first group equals TIME_SLICE. It is the smallest time range handled by the Block Manager implemented in Vectorwise.

Time ranges are counted from the current moment, thus the lower boundary of the range represented by the first bucket ($start_1$) equals 0.

Figure 7:
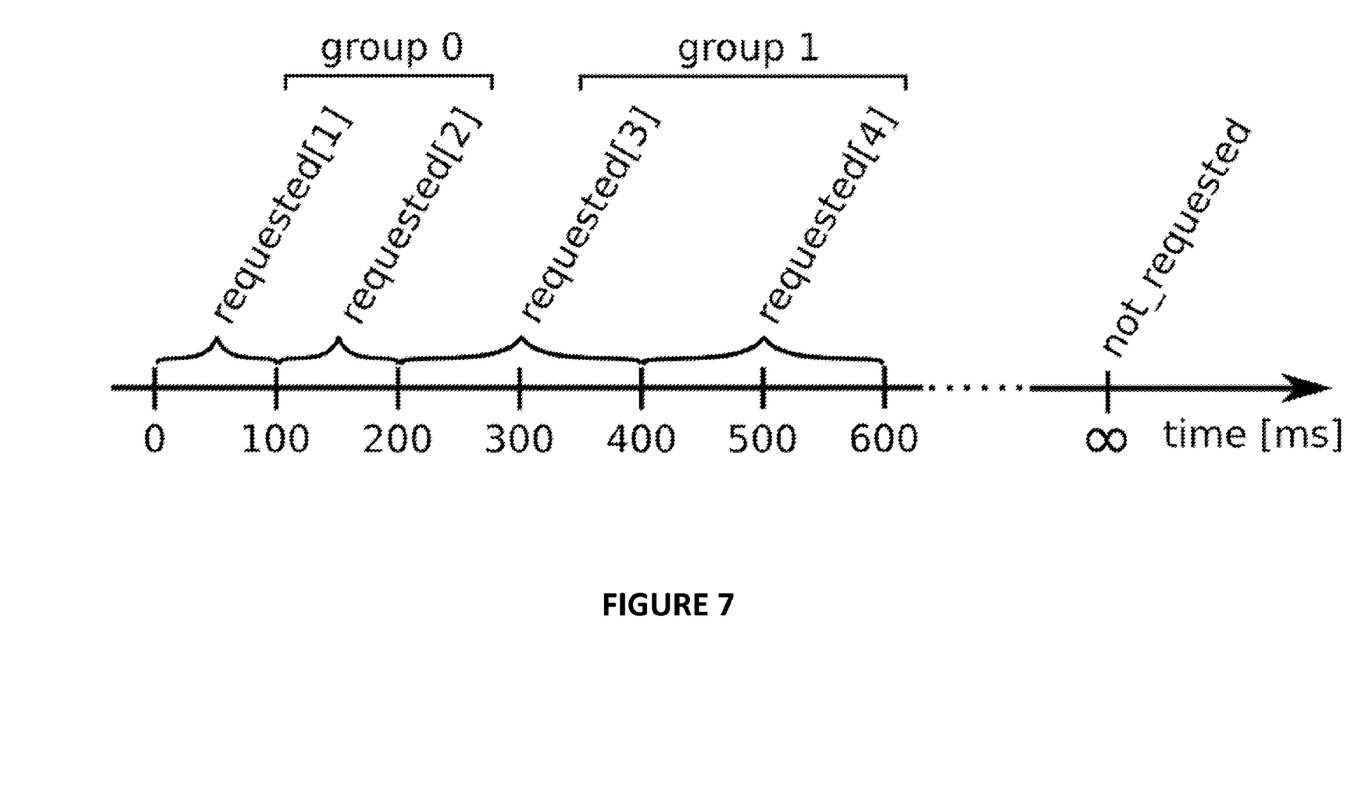
FIG. 7 illustrates an example implementation of the Block Manager component that is part of Predictive Buffer Management method depicted in FIG. 5.

FIG. 7 presents an example representation of requested buckets, where m=k=2, N=4 and TIME_SLICE=100 ms. As can be observed, the total time range that can be handled by those buckets is [0 ms, 600 ms). Additionally, blocks belonging to not_requested bucket can be treated as expected to be consumed in infinitely distant point it time.

Requested Buckets Refresh Process

The "requested" collection of buckets can not be kept unchanged over time. As the time passes, the state of blocks in the "requested" buckets becomes inconsistent with the predictions that were made for them. To avoid stale information, the PBM executes a refresh process every predetermined period of time, such as TIME_SLICE ms. The refresh process may shift the buckets from "requested" collection by 1 position to the left depending on the length of time range a certain bucket represents. For example, if the length equals TIME_SLICE, the bucket is moved every time the refresh process is performed. If the length equals 2*TIME_SLICE the bucket is shifted every other time the process is done etc. Furthermore, empty buckets are created on positions where a bucket was shifted but no other bucket replaced it.

Blocks belonging to bucket "requested[1]" need to be handled separately, because requested[1] can not be shifted to "requested[0]". Priorities of blocks belonging to it are recalculated. However, if the previous predictions were accurate, "requested[1]" should be empty or contain few blocks.

Predictor

The Predictor module is the core of the Predictive Buffer Management method that is responsible for making predictions and deciding when to do that. The Predictor module communicates with the Operator Manager to get information about workload and with the Block Manager to inform it that the block priority (influencing the bucket where a block is placed) should be changed. In the embodiment of the Predictive Buffer Management method used in Vectorwise, the Predictor works as follows.

When a new block is loaded into Buffer, or its priority needs to be changed, Predictor inspects the attributes of the block in the following way.

If the "is_prefetched" flag is set to TRUE, Predictor informs Block Manager to place this block in the "prefetched" bucket. Otherwise, the "request_count" attribute is checked. If it equals 0, the block is placed in the "not_requested" bucket by Block Manager. Finally, if "request_count" is greater than 0, Predictor needs to perform the process of estimating the next consumption time of a block.

The time of next consumption of a certain block is calculated as a minimum of expected consumption times of all Iterators which might request that block. Thus, the process involves analyzing all Iterators that registered that block. To do that, the "paxgroup_state" attribute is used to get the PaxGroupState structure that contains references to all Iterators interested in that block. The "paxgroup_state" attribute can be a direct pointer to the appropriate PaxGroupState data structure or any other kind of reference that allows to retrieve it e.g. an identifier. In the embodiment of the Predictive Buffer Management method implemented in Vectorwise a direct pointer is used. Once PaxGroupState structure is retrieved, Predictor iterates over all Iterators stored in its "iterators" attribute. For each of them the estimated time of consumption of the block is calculated.

To determine the time of next consumption two parameters are required: the estimation of Iterators's processing speed and the distance between the block and the current Iterators's position.

The speed should be available through the Iterator's "speed" attribute. If it is not the case, the Iterator must have not reported its position yet. If this speed can not be determined, the process continues to the next Iterator. The approximate distance is determined as follows:

- To get the chunk a certain block belongs to, it's "first_tuple" attribute is divided by CHUNK_SIZE i.e. chunk_nr=block.first_tuple/CHUNK_SIZE, the result is rounded down to closest integer.
- Now, the number of tuples that this Iterator needs to process before reaching this chunk can be read from Iterator's "tuples_to_consume[ ]" index i.e. tuples_to_consume[chunk_nr].
- The distance is calculated as the difference between tuples_to_consume[chunk_nr] and Iterator's tuples consumed attribute i.e. distance=tuples_to_consume[chunk_nr]−tuples_consumed.

The delay between current point in time and expected consumption time equals:

$$next\_consumption\_time = distance/speed$$

The distance is expressed in tuples, while the speed in tuples per microsecond, thus the result is expressed in microseconds.

Once the minimal value of "next_consumption_time" among all Iterators is found, the block is placed on the "requested" bucket that represents corresponding time range. If no such bucket exists, i.e. the value is larger than the upper boundary of time range represented by last bucket, the last bucket is used.

In case there was no iterator having a speed estimate, the predictor instructs the Block Manager to place it in the reserved bucket.

The Predictor component also decides when to perform the above-mentioned process of making decision where to put a certain block. The following situations trigger it:

When a block is registered with pbm_register_blocks( ) call.

When processing of a block has finished and it needs to be put back to one of Block Manager's buckets.

When first speed estimate for a certain iterator becomes available. Then priorities of all blocks registered by this iterator are recalculated.

Evictor

Figure 6:
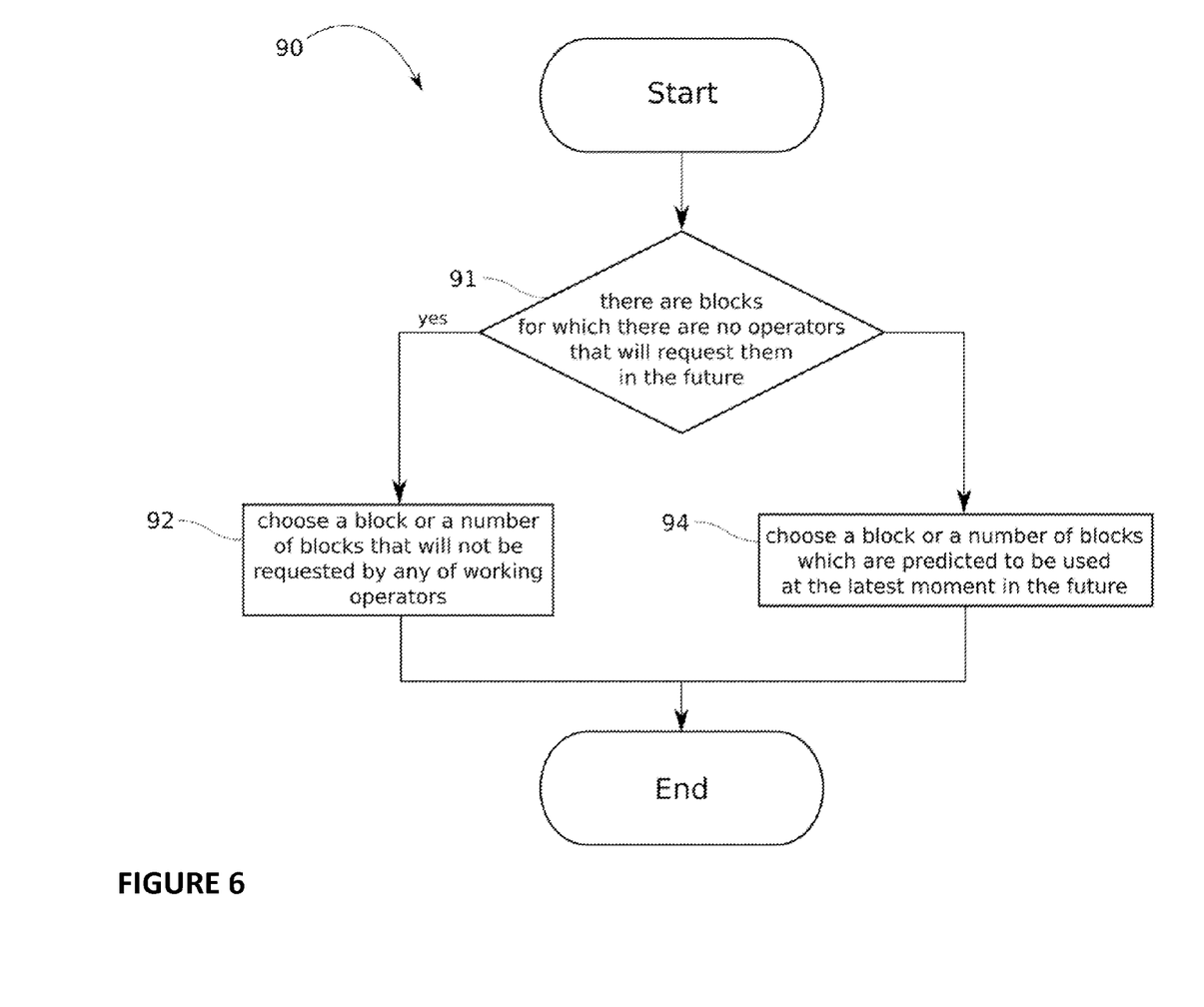
FIG. 6 illustrates an example implementation of the Evictor component that is part of Predictive Buffer Management method depicted in FIG. 5.

When the Buffer is full and a request is made for a block that is not cached, one of the already cached blocks needs to be evicted. The process of eviction is managed by the Evictor module. Evictor that is a part of the embodiment of Predictive Buffer Management method implemented in Vectorwise communicates with the Block Manager to find a block that should be evicted. The process is depicted in FIG. 6 and works in the following way.

First, Block Manager is asked if there are blocks in the "not_requested" bucket. If so, a block is removed from this bucket. If the bucket is empty, the search continues to "requested" buckets, starting from the last one (requested [N]). The Evictor component tries to find a non-empty "requested" bucket with largest number and evict a block from it. If this turns out to be impossible as well, the "reserved" bucket is checked. Finally, if the "reserved" bucket is empty, the Evictor checks the "prefetched" bucket. In case all buckets in the system are empty, the Evictor waits a specified amount of time and repeats the same process again. This situation can only happen of all blocks cached in the buffer pool are processed. Typically, the Evictor finds either the "not_requested" bucket or one of "requested" buckets to be non-empty and evicts block from there allowing the Operator that requested eviction to continue with loading its blocks.

Benchmark Results

Concurrent Environment

The PBM system shows most of its advantage in an environment where many queries accessing the same data set are running in parallel (a concurrent access database). In such a case, buffer reuse opportunities arise to a large extent and exploiting them is important for performance. The PBM system was tested with the TPC-H, an industry-standard benchmark for analytical databases (more details may be found at http://www.tpc.org/tpch/ which is incorporated herein by reference.) One of the benchmark tests is the TPC-H throughput run which tests a concurrent environment. Note that these results are for demonstrational purposes only and should not be considered a valid TPC-H benchmark.

Figure 8:
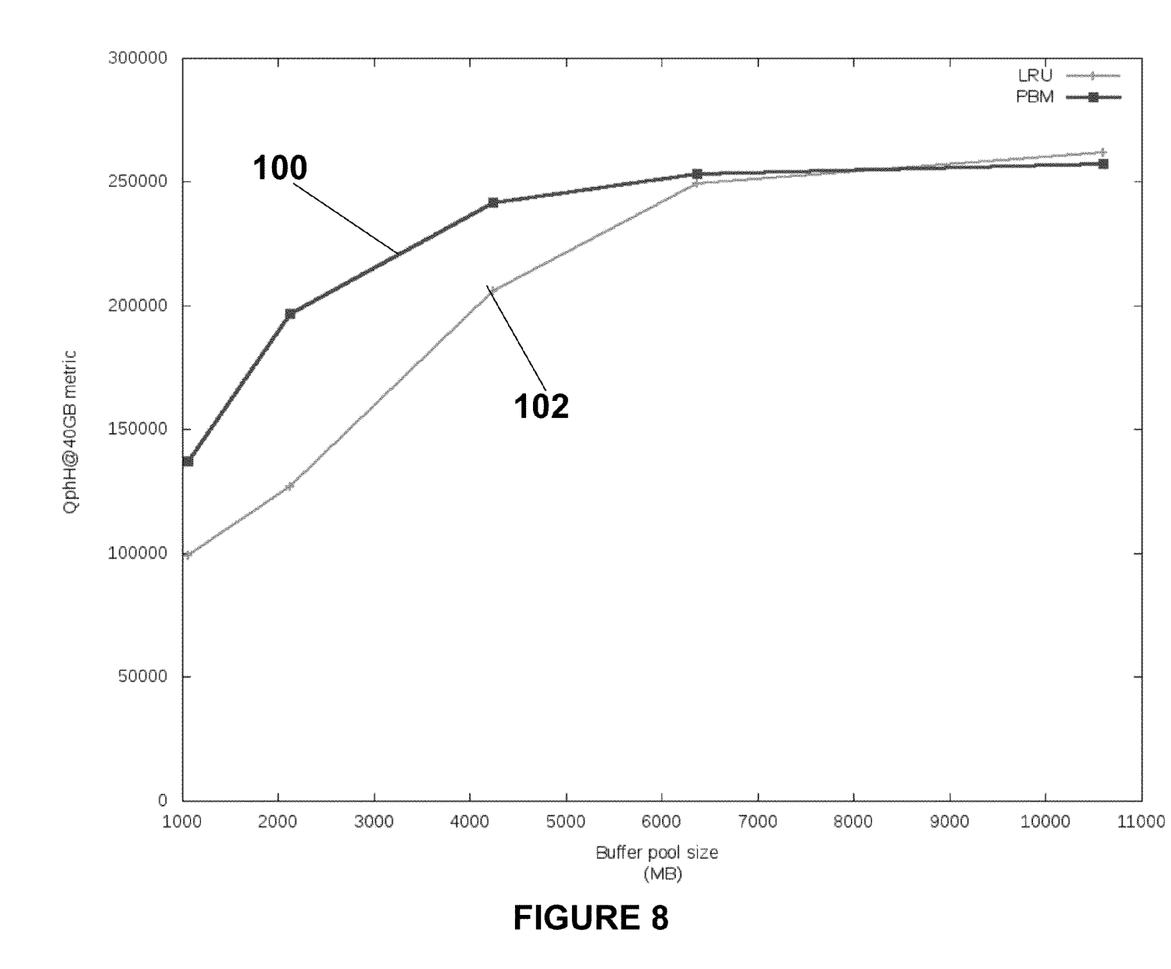
FIG. 8 is a chart illustrating the performance benefits of the PBM method over an LRU method.

FIG. 8 is a chart illustrating the performance benefits of the PBM method over an LRU method in a concurrent environment. In particular, the chart presents the results of TPC-H throughput executed on scale factor 40 dataset with varying sizes of the buffer pool on a 8-core Xeon X5560 server. A first line 122 indicates experiments with a typical LRU policy, while the second line 120 shows the results using the PBM system. For this dataset and queries, 10 GB of buffer pool is enough to cache every needed block. With the size of buffer pool going down, it can be seen that a performance degradation is much higher for LRU than for the PBM process.

There are additional performance benchmarks available showing even 3× performance improvement in concurrent scenarios. Factors influencing performance include: number of concurrent queries, their complexity, size of the buffer pool versus the size of the data, processing speed versus disk speed.

Sequential Environment

PBM also provides benefits in situations with just one active query in the system. For example, for the scenario described in the beginning around the LRU discussion, the PBM method would keep all the cached blocks in memory causing minimal I/O.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for predictive buffer management for a computer system, comprising:
    a store containing data organized in one or more access units;
    an application that accesses the data stored in the store, the application defining a set of requirements of the data being processed from the store; and
    a predictive buffer manager having a buffer that provides data from the store to the application by caching one or more access units of the data in the store into the buffer, wherein the predictive buffer manager evicts data from the buffer when the buffer is full based on the set of requirements of the data being processed by the application and an estimated application data processing speed.

2. The system of claim 1, wherein the predictive buffer manager further comprises an operator manager that tracks one or more operators that process data stored in the access units.

3. The system of claim 2, wherein the operator manager allows the one or more operators to register a data need.

4. The system of claim 3, wherein the operator manager tracks the progress of the processing done by each of one or more operators.

5. The system of claim 4, wherein the predictive buffer manager further comprises a predictor component that estimates a next time a certain access unit is consumed by using information gathered by the operator manager.

6. The system of claim 1, wherein the predictive buffer manager further comprises a block manager component that stores the one or more access units and a priority for each access unit.

7. The system of claim 6, wherein the block manager component keeps the access units based on the priorities assigned by the predictor component to each access unit allowing the predictive buffer manager to modify priorities and retrieve access units with a lowest priority.

8. The system of claim 7, wherein the predictive buffer manager further comprises an evictor component that makes a decision to evict a particular access unit when the buffer is full.

9. The system of claim 5, wherein the predictive buffer manager further comprises an evictor component that makes a decision to evict a particular access unit when the buffer is full based on the prediction made by the predictor component.

10. The system of claim 9, wherein the evictor component starts the process of evicting the particular access unit by finding an access unit that is not requested by any of operators registered in the operator manager.

11. The system of claim 10, wherein the evictor module evicts the particular access unit with a highest estimated time of the next consumption when it is not possible to find a particular access unit that is not registered by any of the operators kept by the operator manager component.

12. The system of claim 1, wherein the store is a database and each access unit is a block of data and the application is a database engine.

13. A method for predictive buffer management for a computer system, the method comprising:
- storing, in a store, data organized in one or more access units;
- accessing, using an application, the data stored in the store, the application defining a set of requirements of the data being processed from the store;
- caching, by a buffer, one or more access units of the data in the store being used by the application; and
- evicting, by a predictive buffer manager associated with the buffer, data from the buffer when the buffer is full based on the set of requirements of the data being processed by the application and an estimated application data processing speed.

14. The method of claim 13 further comprising tracking, by an operator manager of the predictive buffer manager, one or more operators that process data stored in the access units.

15. The method of claim 14 further comprising allowing, by the operator manager of the predictive buffer manager, the one or more operators to register a data need.

16. The method of claim 15 further comprising tracking, by the operator manager of the predictive buffer manager, a progress of the processing done by each of one or more operators.

17. The method of claim 16 further comprising estimating, by a predictor component of the predictive buffer manager, the next time a certain access unit is consumed by using information gathered by the operator manager.

18. The method of claim 13 further comprising storing, by a block manager component of the predictive buffer manager, the one or more access units and a priority for each access unit.

19. The method of claim 18 further comprising keeping, by the block manager component, the access units based on the priorities assigned by the predictor component to each access unit allowing the predictive buffer manager to modify priorities and retrieve access units with a lowest priority.

20. The method of claim 13 further comprising making, by an evictor component of the predictive buffer manager, a decision to evict a particular access unit when the buffer is full.

21. The method of claim 17 further comprising making, by an evictor component of the predictive buffer manager, a decision to evict a particular access unit when the buffer is full based on the prediction made by the predictor component.

22. The method of claim 21 further comprising starting, by the evictor component, a process of evicting the particular access unit by finding an access unit that is not requested by any of operators registered in the operator manager.

23. The method of claim 22 further comprising evicting, by the evictor component, a particular access unit with a highest estimated time of next consumption when it is not possible to find a particular access unit that is not registered by any of the operators kept by the operator manager component.

* * * * *